(12) United States Patent
Schneider et al.

(10) Patent No.: US 9,027,598 B2
(45) Date of Patent: May 12, 2015

(54) STEPLESSLY ADJUSTABLE HYDRAULIC INSERT VALVE

(71) Applicant: Robert Bosch GmbH, Stuttgart (DE)

(72) Inventors: Konrad Schneider, Fellen (DE); Liebhart Zaiser, Karlstadt (DE); Andre Selke, Naumburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/082,692

(22) Filed: Nov. 18, 2013

(65) Prior Publication Data

US 2014/0158220 A1 Jun. 12, 2014

(30) Foreign Application Priority Data

Dec. 6, 2012 (DE) .......................... 10 2012 222 399

(51) Int. Cl.
*F16K 11/07* (2006.01)
*F16K 27/00* (2006.01)
*F16K 31/06* (2006.01)

(52) U.S. Cl.
CPC .................. *F16K 27/00* (2013.01); *F16K 11/07* (2013.01); *F16K 31/0613* (2013.01)

(58) Field of Classification Search
USPC ....................................... 251/129.08, 129.15; 137/625.67–625.69, 625.34–625.35, 137/625.37–625.39
See application file for complete search history.

(56) References Cited

U.S. PATENT DOCUMENTS

| | | | | |
|---|---|---|---|---|
| 3,016,917 | A | | 1/1962 | Hunt |
| 4,422,475 | A | * | 12/1983 | Aspinwall ................ 251/129.08 |
| 4,457,341 | A | * | 7/1984 | Aspinwall ................ 137/625.68 |
| 4,615,358 | A | * | 10/1986 | Hammond et al. ....... 137/625.65 |
| 4,646,786 | A | | 3/1987 | Herder et al. |
| 4,715,407 | A | * | 12/1987 | Aranovich ............... 137/625.69 |
| 4,741,365 | A | * | 5/1988 | Van Ornum ............. 137/625.69 |
| 5,249,603 | A | | 10/1993 | Byers, Jr. |
| 2009/0057588 | A1 | * | 3/2009 | Reilly ....................... 251/129.15 |
| 2009/0255593 | A1 | * | 10/2009 | Nordstrom et al. ........... 137/544 |

FOREIGN PATENT DOCUMENTS

| | | |
|---|---|---|
| DE | 10 2008 013 270 A1 | 9/2009 |
| EP | 1 420 321 A2 | 5/2004 |
| SU | 981718 | 12/1982 |
| WO | 2009/088504 A1 | 7/2009 |

* cited by examiner

*Primary Examiner* — John Bastianelli
(74) *Attorney, Agent, or Firm* — Maginot, Moore & Beck LLP

(57) ABSTRACT

A steplessly adjustable hydraulic insert valve has a housing defining a radial direction and an end side in an installation direction. An inflow connector on the end side is connectable to a pressure medium source. First and second working connectors and a return connector are arranged in the radial direction. The return connector is connectable to a pressure medium tank. The housing has an axial bore and an actuator guided movably therein. The actuator can be held in an axial center position by at least one spring and is adjustable steplessly axially out of the center position by controllable actuation. At least one of the working connectors is fluidically connectable to the return connector by axial adjustment of the actuator. The actuator has a radial widened portion with first and second control edges for steplessly opening and/or closing first and second radial openings, respectively, of the return connector.

10 Claims, 1 Drawing Sheet

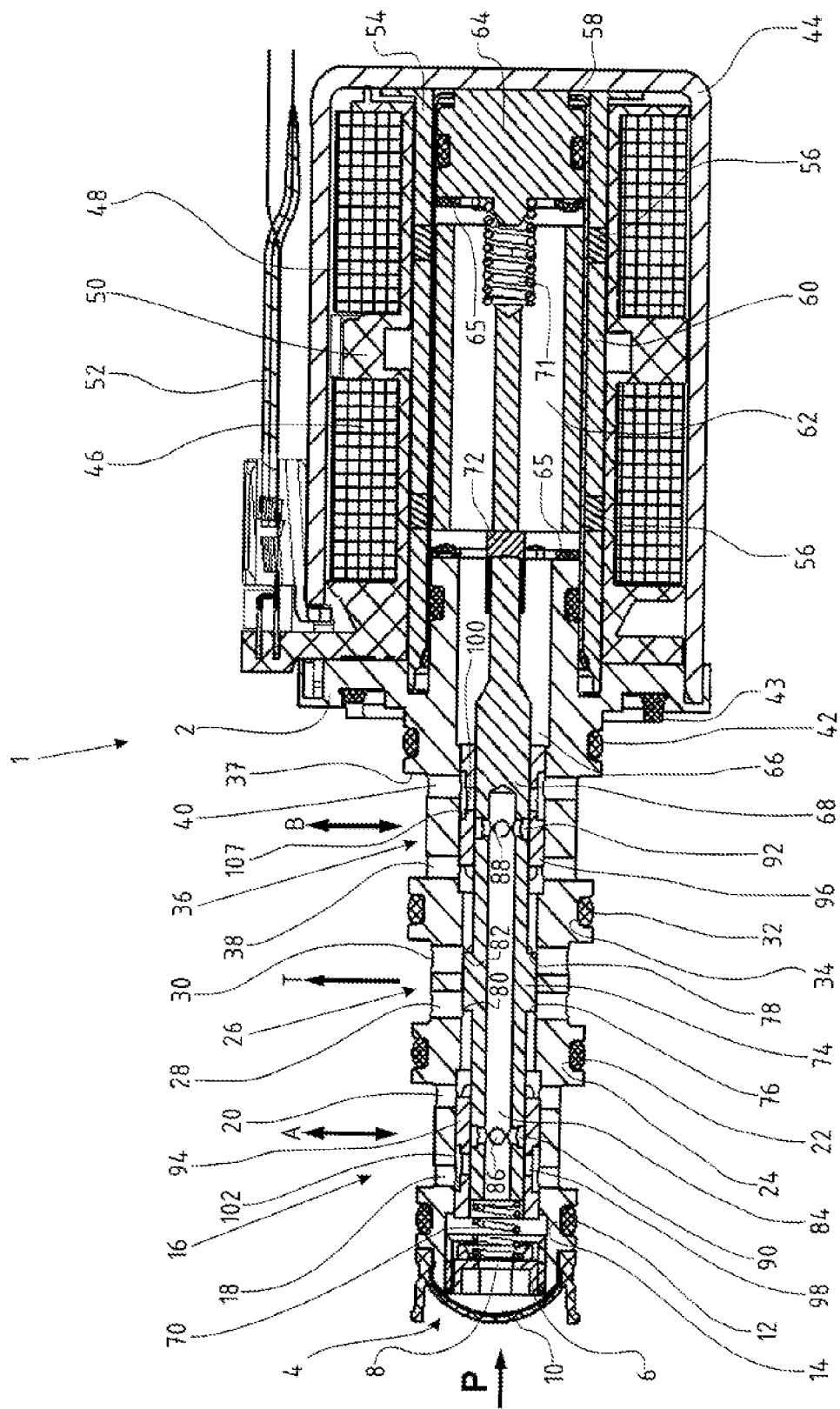

STEPLESSLY ADJUSTABLE HYDRAULIC INSERT VALVE

This application claims priority under 35 U.S.C. §119 to patent application no. DE 10 2012 222 399.1, filed on Dec. 6, 2012 in Germany, the disclosure of which is incorporated herein by reference in its entirety.

BACKGROUND

The disclosure relates to a steplessly adjustable hydraulic insert valve in accordance with the description below.

It is known that proportional directional valves which permit a stepless change in a hydraulic volumetric flow are used in numerous hydraulic applications. For example, proportional directional valves of this type can be used in hydraulic control plate valves for tractors and mobile work implements. One example of a valve of this type is apparent from DE 10 2008 013 270 A1 in the form of a 4/3-way insert valve which makes four hydraulic connectors and three valve positions possible. The electromagnetically actuable directional insert valve which is described therein is provided for being installed into a receiving bore or a stepped bore. It is disadvantageous that a proportional directional valve of this type is structurally complicated and therefore has to be manufactured expensively.

A proportional valve is apparent from EP 1 420 321 A2 which has a completely different connector configuration from the above-described directional insert valve which is known from DE 10 2008 013 A1. It has a housing with a first and a second working connector, an inflow connector and a return connector. A valve slide is received axially displaceably in the housing and is held in an axial center position by at least one spring. The valve slide can be adjusted out of the center position in two opposed axial directions by means of a magnet. Away from the center position, furthermore, in each case one working connector is connected fluidically to the return connector, the other working connector being pressure-controlled. It is disadvantageous that a proportional valve of this type is structurally complicated and therefore of expensive configuration. It has proven disadvantageous in practice that a valve of this type requires a relatively large amount of installation space.

A further example of a proportional valve is described in U.S. Pat. No. 5,249,603 A. It is also disadvantageous here that the described valve is of structurally complicated construction and requires a relatively large amount of installation space.

It is therefore the object of the disclosure to provide a space-saving insert valve using means which are structurally as simple as possible, with the option of hydraulic pressure control.

This object is achieved by way of a hydraulic insert valve having the features described below.

Advantageous developments of the disclosure are specified in the description below.

SUMMARY

The steplessly adjustable hydraulic insert valve according to the disclosure has a housing which, on the end side in its installation direction, has a hydraulic inflow connector which can be connected to a pressure medium source and, in the radial direction, has a first and a second hydraulic working connector which can be connected fluidically, in particular, to a hydraulic actuator or consumer, and has a hydraulic return connector which can be connected to a pressure medium tank. The housing has an axial bore with an actuator which is guided axially movably therein, can be held in an axial center position by means of at least one spring and can be adjusted steplessly axially out of the center position by way of a controllable actuation. The first working connector and/or the second working connector can be connected fluidically to the return connector by way of an axial adjustment of the actuator. According to the disclosure, the actuator has a radial widened portion with a first control edge for steplessly opening and/or closing a first radial opening of the return connector and with a second control edge for steplessly opening and/or closing a second radial opening of the return connector.

Stepless adjustability of the actuator is to be understood to mean that the first and the second control edge can continuously open and close the associated radial openings of the return connector when the actuator is moved out of its spring-centered center position in the corresponding axial direction. Here, the actuator can be a valve slide which is known in hydraulics and has a radial widened portion. In order to form the first and/or the second radial opening of the return connector, the housing of the insert valve can have, for example, a first row of radial apertures and a second row of radial apertures. The actuator can be mounted in such a way that it can be moved within the axial bore out of a spring-centered center position in two opposed axial directions by way of actuation, the actuation preferably taking place electromagnetically. The pressure medium source can be any desired type of device which generates hydraulic pressure, for example a hydraulic pump.

The structural embodiment according to the disclosure of the actuator permits a particularly short overall configuration of the insert valve. As a result, it is advantageously possible to insert or install said insert valve into a receiving bore for a 4/3-way proportional valve in a cartridge configuration with identical connector configuration. In other words, the disclosure provides a 4/3-way pressure control valve which, with an identical connector configuration, fits into the receiving bore of a 4/3-way proportional valve. It is notable here that the insert valve according to the disclosure is of considerably simpler construction than a corresponding proportional valve. The disclosure therefore makes the ability to exchange a conventional proportional valve possible in a particularly inexpensive way.

The fluidic connection of the first and/or second working connector to the return connector can be controlled particularly precisely if the widened portion of the actuator is delimited axially by a first axial face and a second axial face which points away from said first axial face, it being possible for in each case one of the axial faces to be relieved fluidically away from the axial center position of the actuator. An advantage of this is that in each case one of the two axial faces is relieved toward the return connector away from the center position of the actuator, with the result that only the fluidic force on the other, that is to say the active, axial face is utilized for pressure regulation of the insert valve. Moreover, a radial widened portion, configured in this way, of the actuator can be manufactured simply in terms of manufacturing technology.

One particularly advantageous embodiment of the disclosure provides that, in the center position of the actuator, the first axial face is arranged in the region of the first radial opening of the return connector and the second axial face is arranged in the region of the second radial opening of the return connector. This spatial arrangement of the widened portion along the actuator permits a particularly simple embodiment of the insert valve.

It is expedient if the first and/or the second working connector in each case have/has a first and a second radial opening which are spaced apart from one another in the axial direction. Here, the first and the second radial opening can penetrate the housing in the radial direction, for example in the form of a first row of apertures and a second row of apertures.

One advantageous embodiment of the disclosure provides that the first radial opening of the first and/or the second working connector is connected fluidic ally to in each case one axial face of the actuator.

It is advantageous if a fluidic connection of the inflow connector to the respective working connector can be controlled steplessly by means of the second radial opening of the first and/or the second working connector.

In one preferred development of the disclosure, the actuator has an axial bore which runs in the longitudinal direction of the actuator or the insert valve and can be connected fluidically to the inflow connector of the insert valve. An axial bore can be introduced simply in terms of manufacturing technology into the actuator and makes precise control of a fluid flow from the inflow connector through the actuator possible. Furthermore, the axial bore of the actuator makes it possible to save an annular sealing element in the form of what is known as an O-ring.

One advantageous embodiment of the disclosure provides that the axial bore of the actuator has a first radial opening and a second radial opening which can be connected fluidically to the first and/or the second working connector.

For precise guidance of the actuator and simple mounting capability of the actuator within the housing, it has proven advantageous if a separate first bush and a separate second bush can be introduced into the housing and can be fastened in the housing. The first and the second bush therefore make simple mounting possible of the actuator including its widened portion within the axial bore of the housing, which axial bore can therefore have a constant bore diameter throughout. In addition, the actuator is mounted in an axially displaceable manner, without permitting tilting of the actuator within the axial bore of the housing.

In order to seal the axial bore of the housing in the axial direction and at the same time to make a fluidic connection of the valve connectors possible, the first bush and/or the second bush can in each case have a radial opening which can be connected fluidically to in each case one working connector.

The disclosure can be utilized particularly advantageously if the insert valve is configured as what is known as a cartridge valve.

BRIEF DESCRIPTION OF THE DRAWINGS

In the following text, one advantageous exemplary embodiment of the disclosure will be explained in greater detail using the drawing, in which, in detail:

The FIGURE shows one exemplary embodiment of an insert valve according to the disclosure in a longitudinal section.

DETAILED DESCRIPTION

The FIGURE shows an insert valve 1 according to the disclosure of cartridge configuration in a longitudinal section. An insert valve 1 of this type is particularly suitable for installation in a receiving bore, into which otherwise a conventional 4/3-way valve is installed, as is known, for example, from DE 10 2008 013 270 A1. That is to say, the 4/3-way valve which is known from DE 10 2008 013 270 A1 can be replaced by the insert valve 1 according to the disclosure, without it being necessary for the receiving bore to be modified appreciably for this purpose.

The insert valve 1 has a housing 2 which is preferably manufactured from a steel. On an end side which is arranged on the left in the FIGURE, the housing 2 has a hydraulic inflow connector 4, via which a pressure medium, that is to say, for example, a hydraulic oil, can be fed to the insert valve 2 in a feed direction P, that is to say in a pressure feed direction. The inflow connector 4 is formed by a closure piece 6 which is screwed into the housing 2 and has an inlet bore 8 provided in it. The closure piece 6 is manufactured from a steel and is covered by an inflow screen 10 which is manufactured from plastic, in order to be protected against the ingress of dirt. For screwing into the housing 2, the closure piece 6 has an external thread which interacts with an internal thread of the housing 2.

An annular sealing element 12 in the form of an O-ring is arranged on the outer side of the housing 2 downstream of the inflow connector 4 in the inflow direction P, which annular sealing element 12 is received in the circumferential groove 14 of the housing 2. The annular sealing element 12 seals the inflow connector 4 with respect to the receiving bore when the insert valve 1 is installed in a receiving bore.

Furthermore, the housing 2 has a first hydraulic working connector 16 which is arranged downstream of the annular sealing element 12 in the feed direction P. The first working connector 16 is configured in the form of a groove which is circumferential on the outside of the housing 2, and has a first row of radial openings 18 and a second row of radial openings 20 which are spaced apart from one another in the axial direction of the insert valve 1, that is to say in the feed direction P. In other words, the first working connector 16 has two radial openings 18, 20 which are separated fluidically from one another and penetrate the housing 2 in the radial direction. That is to say, the first and the second row of radial openings 18, 20 represent two individual ducts, which are separated from one another, of the first working connector 16. The first and the second row of radial openings 18, 20 can be introduced into the housing 2 in the form of bores.

A further annular sealing element 22 is arranged in a circumferential groove 24 of the housing 2 downstream of the first working connector 16 in the inflow direction P. Said annular sealing element 22 seals the first working connector 16 from a return connector 26 which is arranged downstream of it in the inflow direction P, when the insert valve 1 is installed in the receiving bore. The return connector 26 is configured in the form of a groove which is circumferential on the housing 2, and has a first row of radial openings 28 and a second row, separate fluidically from the former, of radial openings 30 which are spaced apart from one another in the inflow direction P. That is to say, the first and the second row of radial openings 28, 30 represent two individual ducts, which are separated from one another, of the return connector 26. A pressure medium which is fed to the insert valve 1 can be fed via the return connector 26, for example, to an oil tank (not shown).

Furthermore, the housing 2 has a further annular sealing element 32 in the form of an O-ring which is received in a circumferential groove 34 of the housing 2 and seals the return connector 26 fluidically with respect to a second working connector 36 which is arranged downstream of it in the feed direction P. The second working connector 36 is configured in the form of a circumferential groove 37 on the outside of the housing 2 and has a first row of radial openings 38 and a second row of radial openings 40. The first and the second row of radial openings 38, 40 of the second working connector 36 are spaced apart from one another in the inflow direction P and are separated from one another fluidically. That is to say, the first and the second row of radial openings 38, 40 represent two individual ducts, which are separated from one another, of the second working connector 36. They can be introduced into the housing 2, for example, in the form of bores. A further annular sealing element 42 is arranged downstream of the second working connector 36 in the inflow direction P, which further annular sealing element 42 seals the second working connector 36 with respect to the receiving bore, when the insert valve 1 is installed into the latter. Furthermore, a housing seal 43 which seals the housing 2 is provided.

On an end side of the housing 2 which lies opposite the inflow connector 4, a coil housing 44 which is manufactured from a steel sheet is flange-connected to said housing 2. A first and a second magnet coil 46, 48 which are supported by a coil former 50 which is manufactured from plastic are arranged in the coil housing 44. In this exemplary embodiment, the coil former 50 is manufactured from polyamide. The two magnet coils 46, 48 can be actuated by means of an electric line 52. The coil former 50 is arranged adjacently with respect to a pole tube 54 which is manufactured from a steel. The pole tube 54 has a magnetic separation in the form of two non-magnetic insert rings 56 which can also, as an alternative, be configured as a non-magnetic welded seam. A non-magnetic sleeve 58 and a magnet armature 60 which is manufactured from a soft iron are arranged within the pole tube 54. The magnet armature 60 has a longitudinal bore 62 for the passage of a pressure medium, which longitudinal bore 62 makes a movement of the magnet in the axial direction possible. An end closure piece 64, manufactured from a steel, of the pole tube 54 including an end stop 65 which is manufactured from brass for the magnet is arranged at an outer end of the coil housing 44.

Furthermore, the housing 2 has an axial bore 66 which extends along the longitudinal direction of the insert valve 1, that is to say in the feed direction P. An actuator 68 which is guided in an axially movable manner and is configured in the form of a valve slide is received in the axial bore 66. The actuator 68 is held in a spring-centered manner in the center position by a first spring 70 which is supported on the closure piece 6 in the housing 2 and a second spring 71 which is supported on the end closure piece 64 in the coil housing 44. The second spring 71 transmits its force to the actuator 68 by means of a driving connection 72.

The actuator 68 has an external diameter which is smaller than the internal diameter of the axial bore 66. In a central region, the actuator 68 has a radially directed, that is to say protruding in a radial direction, widened portion 74 which is fitted into the axial bore 66. The widened portion 74 defines a first axial face 76 and a second axial face 78 which is directed in the opposite direction to the former. In other words, the two axial faces 76, 78 point away from one another. The widened portion 74 and therefore the first and the second axial faces 76, 78 are arranged on the actuator 68 in such a way that they are situated in the region of the return connector 26 in the spring-centered center position of the actuator 68. In particular, the first axial face 76 is arranged in the region of the first radial opening 28 and the second axial face 78 is arranged in the region of the second radial opening 30 of the return connector 26 when the actuator 68 is situated in its center position. In this way, the axial faces 76, 78 form in each case one control edge 80, 82 which can steplessly close and steplessly open in each case one of the rows of radial openings 28, 30 of the return connector 26 when the actuator 68 is moved or is adjusted magnetically in a corresponding axial direction.

Furthermore, the actuator 68 has an axial bore 84 which extends from the inflow connector 4 in the direction of the coil housing 44 as far as the second working connector 36. The axial bore 84 of the actuator 68 is connected fluidically to the inflow connector 4. In the region of the first working connector 16 and the second working connector 36, in each case one row of radial openings 86, 88 are provided on the actuator 68, of which in each case one row can be connected fluidically to the first and the second working connector 16, 36, respectively. In each case one circumferential groove 90, 92 is provided in the region of the rows of radial openings 86, 88.

The mounting of the actuator 68 within the axial bore 66 takes place via a first and a second bush 94, 96, which are inserted in each case as components which are separated from the housing 2, that is to say components which are in each case separate, into the axial bore 66 of the housing 2 and are fastened therein. The first and second bush 94, 96 make the mounting of the actuator 68 possible, which actuator 68 would otherwise only be capable of being inserted with difficulty on account of its widened portion 74. As can be seen clearly in the FIGURE, the bushes 94, 96 therefore fulfill two tasks, namely the mounting of the actuator 68 and a spatial delimitation of pressure spaces between the axial bore 66 and the actuator 68.

Each of the bushes 94, 96 has a row of radial openings 98, 100 which can be configured, for example, as continuous bores. Together with the rows of radial openings 86, 88 of the actuator 68, the rows of radial openings 98, 100 form in each case one control edge for controlling a fluidic connection from the inflow connector 4 to the first and to the second working connector 16, 36, respectively. Furthermore, the bushes 94, 96 in each case have a groove 102, 104 which is circumferential on the outside, which grooves 102, 104 are arranged in the region of the first row of radial openings 18 of the first working connector 16 and the first row of radial opening 38 of the second working connector 36, respectively.

A steplessly adjustable hydraulic insert valve is disclosed having a housing which, on the end side in its installation direction, has an inflow connector which can be connected to a pressure medium source and, in the radial direction, has a first and a second working connector and a return connector which can be connected to a pressure medium tank. The housing has an axial bore with an actuator which is guided axially movably therein, can be held in an axial center position by means of at least one spring and can be adjusted steplessly axially out of the center position by way of a controllable actuation. The first working connector and/or the second working connector can be connected fluidically to the return connector by way of an axial adjustment of the actuator. According to the disclosure, the actuator has a radial widened portion with a first control edge for steplessly opening and/or closing a first radial opening of the return connector and with a second control edge for steplessly opening and/or closing a second radial opening of the return connector.

LIST OF REFERENCE NUMERALS

1 Insert valve
2 Housing
4 Inflow connector
6 Closure piece
8 Inlet bore
10 Inflow screen
12 Annular sealing element
14 Circumferential groove
16 First working connector 18 First row of radial openings of the first working connector
20 Second row of radial openings of the first working connector
22 Annular sealing element
24 Circumferential groove
26 Return connector
28 First row of radial openings of the return connector
30 Second row of radial openings of the return connector
32 Annular sealing element
34 Circumferential groove
36 Second working connector
37 Circumferential groove
38 First row of radial openings of the second working connector
40 Second row of radial openings of the second working connector
42 Annular sealing element
43 Housing seal
44 Coil housing
46 First magnet coil
48 Second magnet coil
50 Coil former
52 Electric line
54 Pole tube
56 Insert ring
58 Non-magnetic sleeve
60 Magnet armature
62 Longitudinal bore
64 End closure piece
65 End stop
66 Axial bore
68 Actuator
70 First spring
71 Second spring
72 Driving connection
74 Radially directed widened portion
76 First axial face
78 Second axial face
80 Control edge
82 Control edge
84 Axial bore of the actuator 68
86 First row of radial openings of the actuator 68
88 Second row of radial openings of the actuator 68
90 Circumferential groove
92 Circumferential groove
94 First bush
96 Second bush
98 Row of radial openings of the first bush 94
100 Row of radial openings of the first bush 96
102 Circumferential groove
104 Circumferential groove
A Flow direction of a hydraulic pressure medium
B Flow direction of a hydraulic pressure medium
P Feed direction of a hydraulic pressure medium
T Flow direction of a hydraulic pressure medium

What is claimed is:

1. A steplessly adjustable hydraulic insert valve, comprising:
   a housing defining a radial direction and having an end side in an installation direction, the housing including:
      an inflow connector arranged on the end side and configured to be connected to a pressure medium source;
      in the radial direction, a first working connector, a second working connector, and a return connector, the return connector configured to be connected to a pressure medium tank;
      an axial bore;
      an actuator configured to be guided axially movably in the axial bore; and
   at least one spring configured to hold the actuator in an axial center position,
   wherein the actuator is configured to be adjusted steplessly axially out of the center position by a controllable actuation,
   wherein at least one of the first working connector and the second working connector is connected fluidically to the return connector by an axial adjustment of the actuator, and
   wherein the actuator has a radial widened portion with a first control edge and a second control edge, the first control edge configured to steplessly open and/or close a first radial opening of the return connector and the second control edge configured to steplessly open and/or close a second radial opening of the return connector.

2. The insert valve according to claim 1, wherein:
   the radial widened portion is delimited axially by a first axial face and a second axial face configured to point away from said first axial face, and
   one of the first and second axial faces is configured to be relieved fluidically away from the axial center position of the actuator.

3. The insert valve according to claim 2, wherein, when the actuator is in the center position, the first axial face is arranged in a region of the first radial opening of the return connector and the second axial face is arranged in a region of the second radial opening of the return connector.

4. The insert valve according to claim 2, wherein at least one of the first working connector and the second working connector has a first radial opening and a second radial opening spaced apart from one another in an axial direction.

5. The insert valve according to claim 4, wherein the first radial opening of the at least one of the first and second working connectors is connected fluidically to one of the first and second axial faces of the actuator.

6. The insert valve according to claim 4, wherein a fluidic connection of the inflow connector to the at least one of the first and second working connectors is configured to be controlled steplessly by the second radial opening of the at least one of the first and second working connectors.

7. The insert valve according to claim 1, wherein the actuator has an axial bore which runs in a longitudinal direction and is connected fluidically to the inflow connector.

8. The insert valve according to claim 7, wherein the axial bore of the actuator has a first radial opening and a second radial opening configured to be connected fluidically to at least one of the first working connector and the second working connector.

9. The insert valve according to claim 1, further comprising a separate first bush and a separate second bush configured to mount the actuator in an axially displaceable manner, the first and second bushes configured to be introduced and fastened in the housing.

10. The insert valve according to claim 9, wherein at least one of the first bush and the second bush have a radial opening connected fluidically to one of the first working connector and the second working connector.

* * * * *